United States Patent [19]

Stuhr

[11] Patent Number: 4,885,489
[45] Date of Patent: Dec. 5, 1989

[54] PERMANENT MAGNET MOTOR WITH HYSTERESIS DRAG CUP COUPLING

[75] Inventor: Leslie P. Stuhr, Corcoran, Minn.
[73] Assignee: Honeywell Inc., Minneapolis, Minn.
[21] Appl. No.: 175,454
[22] Filed: Mar. 30, 1988
[51] Int. Cl.$^4$ .................. H02K 7/12; H02K 49/04
[52] U.S. Cl. ...................... 310/78; 74/5.46; 192/84 PM; 310/105; 310/191
[58] Field of Search .............. 310/72, 78, 103, 105, 310/108, 117, 191, 209, 102 A; 74/5.7, 5.46; 192/84 PM, 84 E; 318/739

[56] References Cited

U.S. PATENT DOCUMENTS

| | | | |
|---|---|---|---|
| 2,484,790 | 10/1949 | Hartig | 318/739 |
| 2,518,009 | 8/1950 | Hess | 310/78 |
| 2,685,043 | 7/1954 | Durant | 310/78 |
| 2,694,781 | 11/1954 | Hinz | 310/77 |
| 2,748,334 | 5/1956 | Miller | 318/243 |
| 3,090,879 | 5/1963 | Lohest | 310/209 |
| 3,139,548 | 6/1964 | Krischker | 310/83 |
| 3,567,980 | 3/1971 | Kreuter | 310/209 |
| 4,011,488 | 3/1977 | Hanagan | 318/139 |
| 4,292,557 | 9/1981 | Kishi | 310/78 |

FOREIGN PATENT DOCUMENTS 823758 12/1951 Fed. Rep. of Germany ........ 310/78

Primary Examiner—Patrick R. Salce
Assistant Examiner—D. L. Rebsch
Attorney, Agent, or Firm—Edward Schwarz; Alfred N. Feldman

[57] ABSTRACT

A permanent magnet, alternating current motor having a variable hysteresis output coupling has an annular permanent magnet rotor caused to rotate within a stator structure. This permanent magnet rotor is capable of being shifted laterally to engage or disengage a hysteresis drag cup output device. With this arrangement either an off-on output torque can be provided, or the output torque can be modulated.

13 Claims, 1 Drawing Sheet

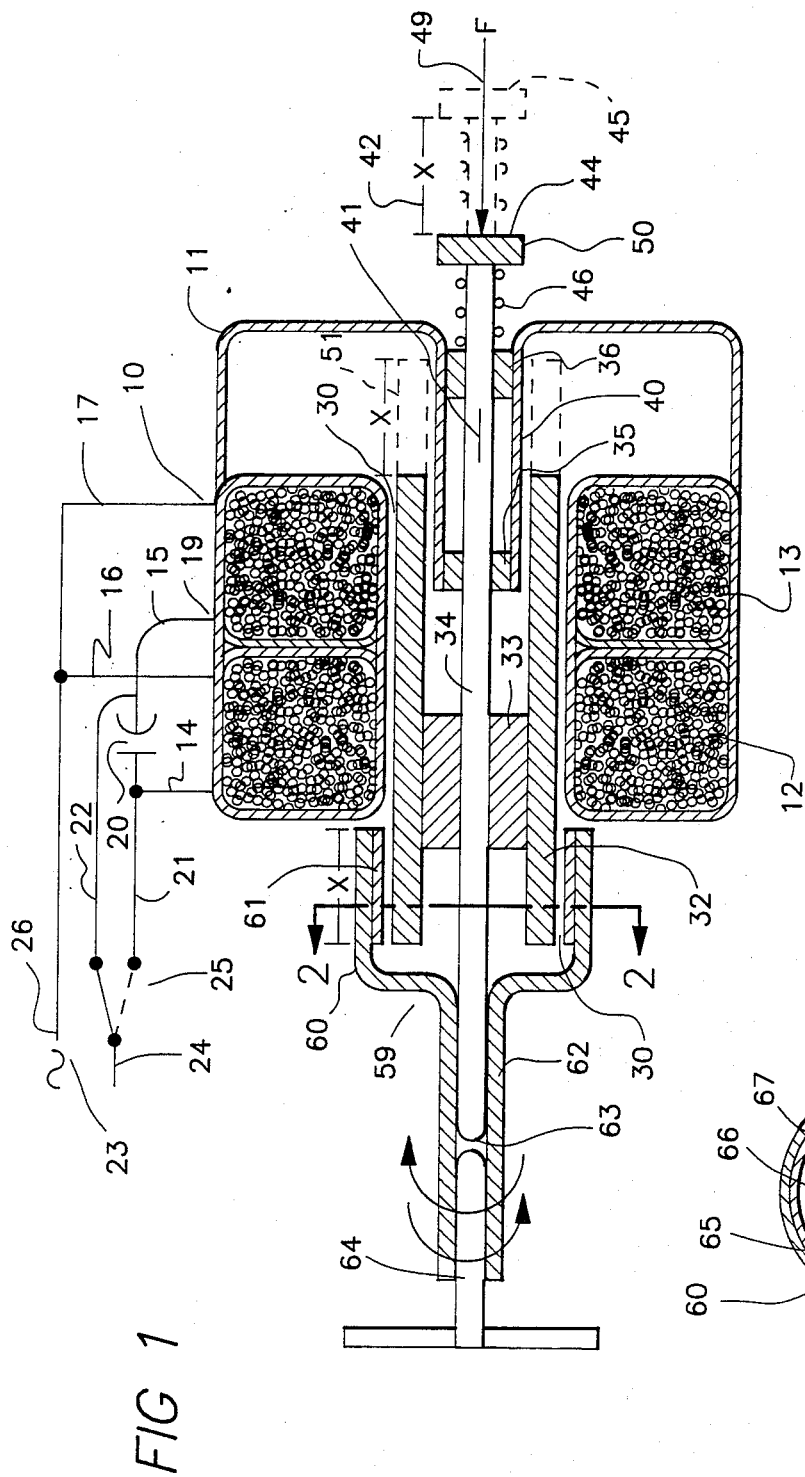

PERMANENT MAGNET MOTOR WITH HYSTERESIS DRAG CUP COUPLING

BACKGROUND OF THE INVENTION

Permanent magnet motors energized from an alternating current source are well-known. Also, it is well-known to utilize various types of couplings from the rotors of such motors. One type of coupling is a hysteresis, drag cup type of coupling. In the typical unit, multiple magnetic structures are required and the output torque from the coupling normally is fixed.

Providing a motor with a variable output coupling has been very expensive, due to the complexity of the structures involved. These structures have had limited control of the torque available from the related coupling.

SUMMARY OF THE INVENTION

The present invention is directed to a permanent magnet motor that is energized from an alternating current source. The motor has a pair of coils that can be energized with a shifted electrical phase arrangement to create a rotating magnetic field in the center of the core structure. This rotating field is applied to a permanent magnet type rotor with alternating magnetic poles.

The rotor of the present motor is substantially longer than the opening within the motor structure, and the rotor is designed to be physically shiftable within the motor opening. Since the rotor member is longer than the core, a portion of the rotor can be shifted to an external position where it enters a hysteresis type drag cup arrangement. When the rotor is extended to engage the hysteresis drag cup arrangement, an output torque is provided.

With the current motor, the shifting can be in a single step, as would be provided by a solenoid operator, or can be modulated to cause a modulated output torque. Also, since the coil structure is arranged with a phase shifting capacitor, the energization of the motor can be shifted to cause the motor rotation to either be a clockwise rotation, or a counterclockwise rotation.

With this arrangement magnetic poles can be provided on the outside diameter of the rotor for both the motor operation and the hysteresis clutch operation. This eliminates the need to produce a rotor having magnetic poles on the interior diameter, as has been done in other devices. This device can provide on-off type clutching, and variable type clutching, depending on the manner in which the rotor is shifted. The present arrangement further eliminates the need for a second magnetic structure.

In accordance with the present invention, there is provided a permanent magnet, alternating current energized motor with hysteresis output coupling means, including: annular stator means having coil means adapted to be energized from an alternating current source to effectively create a rotating magnetic field; said stator means having a central opening in which said rotating magnetic field is applied; permanent magnet rotor means having mounting means to mount said rotor means within said central opening of said stator means; said rotor mounting means providing for rotation of said rotor means; said rotor mounting means further providing for axial shifting of said rotor means; said rotor means having a length exceeding the length of said stator opening; hysteresis drag cup output means mounted for rotation with an axis of rotation corresponding to an axis of rotation for said rotor means; said hysteresis drag cup output means being positioned adjacent said stator means; and rotor shifting means attached to said rotor means; said rotor shifting means providing for shifting of said permanent magnet rotor means into said hysteresis drag cup output means to magnetically couple said rotor means to said hysteresis drag cup output means causing said output means to rotate when said rotor means is rotating.

DESCRIPTION OF THE DRAWINGS

FIG. 1 is a cross-section of the motor, and;
FIG. 2 is a cross-section along lines 2—2 of FIG. 1.

DESCRIPTION OF THE PREFERRED EMBODIMENT

In FIG. 1 there is disclosed a cross-section of a permanent magnet, alternating current energized motor 10. An outside motor enclosure 11 is disclosed which contains a pair of annular stator field windings 12 and 13. Winding 12 is terminated by conductors 14 and 16, while a stator winding 13 is terminated by conductors 15 and 17. A capacitor 20 is connected between the conductors 14 and 15. These elements form a coil means generally indicated at 19.

A conductor 21 is connected to capacitor 20 and conductor 14. A further conductor 22 is provided so that an alternating current source of potential 23 can have a conductor 24 connected to the conductor 21 or conductor 22 by switch means generally disclosed at 25. A common conductor 26 is provided that connects to the conductors 16 and 17 to both coils 12 and 13. By properly positioning the switch means 25, the capacitor 20 can be switched to cause a rotating magnetic field either in the clockwise or counterclockwise direction in an air gap 30. The air gap 30 has a rotating field either clockwise or counterclockwise dependent on the position of the switch means 25. If only a single direction of rotation were desired, the switch means 25 could be eliminated. To this point a conventional stator structure for a motor has been described.

The invention contained in the present motor structure involves the type of rotor, its mounting, and its ability to be shifted in position. A permanent magnet rotor 32 is provided. The rotor 32 is a permanent magnet rotor having alternate magnetic poles, as will be shown in FIG. 2. The rotor means 32 is fastened or mounted by a bushing or collar 33 to a central shaft 34. The shaft 34 is mounted in a pair of bearings 35 and 36 into a tubular-like projection 40 that forms a part of the housing 11. The bearings 35 and 36 allow the shaft 34 to rotate, as well as shift laterally as is indicated by the arrow 41. The amount of the shifting or movement 41 is the length "X" indicated at 42 between the end 44 of the shaft 34 and a phantom position 45. A spring 46 is positioned between the bearing 36 and an extension 50 on the end of the shaft 34. The spring 46 is necessary to axially shift the rotor 32 through its complete excursion to the right into the phantom position 51 if there are not magnetic centering forces which automatically place the rotor in the phantom position 51 when force F symbolized by arrow 49 is not applied.

The movement of the shaft 34 allows the rotor means 32 to assume the position shown, or the position indicated in phantom at 51. It will be noted that the length of the rotor 32 is greater than the air gap 30 of the motor 10 by an amount or length "X". This allows the rotor 32 to assume the position shown in solid in FIG. 1, or to move to the right to the phantom position. This allows for engaging and disengaging a hysteresis drag cup output means 59 that will be described. It is also possible to employ a version of this invention with an axially fixed shaft in the position shown in solid outline in FIG. 1. This design is applicable in a situation where a fixed amount of torque is desired for the application while still avoiding direct coupling between the output shaft and the rotating magnetic field of winding 12.

The hysteresis drag cup output means 59 includes an annular cup 60 of any material which has a collar or sleeve 61 of a highly permeable magnetic steel. The collar of drag cup material 61 is attached by any convenient means to the cuplike member 60. The cup 60 has an annular or tubular extension 62 that acts as a sliding guide for the end 63 of the shaft 34. Attached permanently within the tubular member 62 is an output shaft 64, and the output shaft 64 drives any convenient load with the cup 60.

In FIG. 2 there is a cross-section at 2—2 of FIG. 1 of the hysteresis drag cup output means 59. As previously indicated, the permanent magnet rotor means 32 is shown having a number of alternate magnetic poles 65, 66, 67, etc. The permanent magnetic rotor 32 has the shaft 34 shown centered within it. Also shown is a cross-section of the hysteresis material 61 and the outer cup-shaped member 60.

In operation, energy is supplied to the stator coils 12 and 13 and a rotating magnetic field is provided. The rotating magnetic field drags the permanent magnet rotor means 32 in either a clockwise or counterclockwise direction, dependent on the direction of rotation of the field. As previously indicated, that can either be a single direction, or can be selected by switch means 25 as clockwise or counterclockwise.

In the position shown, the shaft 34 has moved to the left extending a portion of the permanent magnet rotor means 32 the distance "X" into the cup 60 within the hysteresis material 61. The rotation of the permanent magnet rotor means 32 causes a drag cup effect causing the cup 60 to rotate with the shaft 34. This causes the output means 64 to rotate in the appropriate direction.

If a force is removed from the enlarged member 50 at the right end of the shaft 34, the shaft 34 and the rotor means 32 shift to the right position by the distance of "X" to the phantom position. This removes the rotor means 32 from within the drag cup output means 59.

As can be seen, by moving the shaft 34 the distance "X", the hysteresis drag cup output means 59 can be fully engaged or fully disengaged. This allows for full output torque or no output torque. With the arrangement disclosed, the distance "X" has been shown as a single step. It is possible to cause the movement of the shaft 34 by actuation means providing force symbolized by the arrow 49 which acts on extension 50 to shift shaft 34 axially to the left as shown in FIG. 1, thereby increasing the engagement between rotor 32 and cup 60. Movement of the rotor means 32 may be either in a step fashion, or in a modulated fashion. If the rotor means 32 is modulated in or out of the cup 60, the output torque can be varied from zero to a maximum.

The structure of the support means 33 and the bearings 35 and 36 could be varied substantially to alter the way in which the shifting motion and rotational motion is accomplished. The disclosure of FIG. 1 merely is representative of one embodiment of the present invention. Since the present invention could be altered in numerous ways, the applicant wishes to be limited in the scope of his invention solely by the scope of the appended claims.

The embodiments of an invention in which an exclusive property or right is claimed are defined as follows:

1. A permanent magnet, alternating current energized motor with hysteresis output coupling means, including: annular stator means having a pair of coils adapted to be energized from an alternating current source with the energization of said coils shifted in phase to effectively create a rotating magnetic field; said stator means having a central opening in which said rotating magnetic field is applied; permanent magnet rotor means having mounting means to mount said rotor means within said central opening of said stator means; said rotor mounting means providing for rotation of said rotor means; said rotor mounting means further providing for axial shifting of said rotor means; said rotor means having a length exceeding a length of said stator opening; hysteresis drag cup output means mounted for rotation with an axis of rotation corresponding to an axis of rotation for said rotor means; said hysteresis drag cup output means being positioned adjacent said stator means; and rotor shifting means attached to said rotor means; said rotor shifting means providing for shifting of said permanent magnet rotor means into said hysteresis drag cup output means to magnetically couple said rotor means to said hysteresis drag cup output means causing said output means to rotate when said rotor means is rotating.

2. A permanent magnet motor as claimed in claim 1 wherein said pair of coils includes a capacitor to provide said shifted phase for said rotating magnetic field.

3. A permanent magnet motor as claimed in claim 2 wherein switch means is provided from said source of alternating current to switch said capacitor and said coils to selectively provide a direction of rotation depending upon a position of said switch means.

4. A permanent magnet motor as claimed in claim 3 wherein said rotor mounting means and said rotor shifting means are physically joined.

5. A permanent magnet motor as claimed in claim 4 wherein said rotor shifting means is partially spring-loaded to a first position; and said rotor shifting means being moveable to a second position.

6. A permanent magnet motor as claimed in claim 5 wherein said permanent magnet rotor means is a cylindrical permanent magnet with alternating permanent magnet poles.

7. A permanent magnet motor as claimed in claim 6 wherein said rotor shifting means causes said rotor means to abruptly move from one of said positions to said other of said positions.

8. A permanent magnet motor as claimed in claim 6 wherein said rotor shifting means causes said rotor means to move from one of said positions to said other of said positions in a modulating manner to cause said hysteresis drag cup output means to have a modulating output torque.

9. A permanent magnet, alternating current energized motor with hysteresis output coupling means, including: annular stator means having coil means adapted to be energized from an alternating current source to effectively create a rotating magnetic field; said stator means having a central opening in which said rotating magnetic field is applied; permanent magnet rotor means having mounting means to mount said rotor means within said central opening of said stator means;

said rotor mounting means providing for rotation of said rotor means; said rotor mounting means further providing for axial shifting of said rotor means; said rotor means having a length exceeding a length of said stator opening; hysteresis drag cup output means mounted for rotation with an axis of rotation corresponding to an axis of rotation for said rotor means; said hysteresis drag cup output means being positioned adjacent said stator means; and rotor shifting means attached to said rotor means; said rotor shifting means providing for shifting of said permanent magnet rotor means into said hysteresis drag cup output means to magnetically couple said rotor means to said hysteresis drag cup output means causing said output means to rotate when said rotor means is rotating.

10. The motor of claim 1, wherein the hysteresis drag cup means includes a tubular extension, and wherein the rotor means includes a shaft having an end projecting into the tubular extension, which extension forms a guide for said shaft end.

11. A permanent magnet, alternating current energized motor with hysteresis output coupling means, including: annular stator means having a pair of coils adapted to be energized from an alternating current source with the energization of said coils shifted in phase to effectively create a rotating magnetic field; said stator means having a central opening in which said rotating magnetic field is applied; permanent magnet rotor means having mounting means to mount said rotor means within said central opening of said stator means; said rotor mounting means providing for rotation of said rotor means; said rotor means having a length exceeding a length of said stator opening; hysteresis drag cup output means mounted for rotation with an axis of rotation corresponding to an axis of rotation for said rotor means; and said permanent magnet rotor means magnetically coupled to said hysteresis drag cup output means causing transfer of torque to said output means when said rotor means is rotating.

12. The motor of claim 11, wherein an end of the rotor means projects into the hysteresis drag cup output means.

13. The motor of claim 11, wherein the drag cup output means includes an annular cup and a sleeve of highly permeable magnetic material around the interior cylindrical surface of the cup, and wherein the rotor means projects into the cup to a depth at least equal to the depth of the magnetic material sleeve therein.

* * * * *